US009109390B1

(12) United States Patent
Cavuoti (10) Patent No.: US 9,109,390 B1
(45) Date of Patent: Aug. 18, 2015

(54) SCREEN AND METHOD OF USE (71) Applicant: Victor Vito Cavuoti, Toronto (CA)

(72) Inventor: Victor Vito Cavuoti, Toronto (CA)

(*) Notice: Subject to any disclaimer, the term of this patent is extended or adjusted under 35 U.S.C. 154(b) by 0 days.

(21) Appl. No.: 14/287,595

(22) Filed: May 27, 2014

Related U.S. Application Data (63) Continuation-in-part of application No. 13/425,485, filed on Mar. 21, 2012, now abandoned.

(51) Int. Cl.
*E06B 7/02* (2006.01)
*E06B 9/24* (2006.01)
*E06B 9/52* (2006.01)
*A47G 5/00* (2006.01)
*B01D 46/12* (2006.01)

(52) U.S. Cl.
CPC ... *E06B 7/02* (2013.01); *A47G 5/00* (2013.01); *B01D 46/125* (2013.01); *E06B 9/52* (2013.01); *E06B 2009/2447* (2013.01)

(58) Field of Classification Search
CPC ............... E06B 9/52; E06B 2009/524; E06B 2009/2447; E06B 7/02; E06B 9/24; E06B 2009/2423; B32B 3/266; B01D 46/125; A47G 5/00; B60H 1/265; B60H 1/267; B60J 1/20; F24F 13/08
USPC ............ 52/63, 106, 673, 791.1, 656.7; 49/50, 49/61; 160/371; 454/224, 279–282; 428/131, 596
See application file for complete search history.

(56) References Cited

U.S. PATENT DOCUMENTS

| | | | | | |
|---|---|---|---|---|---|
| 13,300 | A | * | 7/1855 | Chase | 52/656.7 |
| 173,722 | A | * | 2/1876 | Hayes | 52/633 |
| 1,277,829 | A | * | 9/1918 | Baum | 52/607 |
| RE22,311 | E | * | 5/1943 | Roy | 160/34 |
| 2,430,518 | A | * | 11/1947 | Mainwal | 428/132 |
| 2,810,604 | A | * | 10/1957 | Francis | 296/97.3 |
| 2,990,027 | A | * | 6/1961 | Sabine | 181/291 |
| 3,703,432 | A | * | 11/1972 | Koski | 428/132 |
| 4,529,520 | A | * | 7/1985 | Lampenius | 210/498 |
| 5,375,373 | A | * | 12/1994 | Tiede | 49/50 |
| 5,570,542 | A | * | 11/1996 | Cameron | 49/463 |
| 5,768,826 | A | * | 6/1998 | Wilcher et al. | 49/61 |
| 6,042,473 | A | * | 3/2000 | McClary | 454/133 |
| 6,698,825 | B1 | * | 3/2004 | Long | 296/215 |
| 8,770,345 | B2 | * | 7/2014 | Dugan et al. | 181/291 |
| 2003/0050006 | A1 | * | 3/2003 | Myint | 454/281 |
| 2004/0201977 | A1 | * | 10/2004 | Edmonds | 362/31 |
| 2005/0233685 | A1 | * | 10/2005 | Fukase | 454/1 |
| 2007/0186493 | A1 | * | 8/2007 | Baig | 52/144 |
| 2012/0080153 | A1 | * | 4/2012 | Croteau | 160/181 |
| 2012/0248816 | A1 | * | 10/2012 | Wan | 296/154 |
| 2013/0133978 | A1 | * | 5/2013 | Borroni | 181/291 |

FOREIGN PATENT DOCUMENTS

GB          2247486 A    *  3/1992

* cited by examiner

*Primary Examiner* — Robert Canfield
(74) *Attorney, Agent, or Firm* — Ted Masters

(57) ABSTRACT

A screen includes a sheet having a first side and an opposite second side. The sheet includes a plurality of holes which pass through the sheet from the first side to the second side. Each hole includes a first opening on the first side and a second opening on the second side. In and embodiment, when the sheet is vertically oriented with its bottom edge down, the first opening is disposed below the second opening. In an embodiment, a layer of conventional screen material is connected to the screen. In other embodiments, the holes are tapered, the holes are configured so as to block vision, the holes have the shape of an inverted V, and a second hole connects spaced apart holes.

4 Claims, 11 Drawing Sheets

Fig. 12

SCREEN AND METHOD OF USE

CROSS REFERENCE TO RELATED APPLICATION

This application is a Continuation-In-Part of and claims the filing benefit under 35 U.S.C. §120 of application Ser. No. 13/425,485, filed Mar. 21, 2012, which is hereby incorporated by reference.

TECHNICAL FIELD

The present invention pertains generally to screens for use in windows, doors, and other applications, and more particularly to a screen fabricated from a sheet which provides increased strength and safety.

BACKGROUND OF THE INVENTION

Screens are commonly used on windows and doors to permit air circulation and to prevent the entry of insects. These screens are constructed of a mesh fabricated from metal wire, a polymer, or netting. As such, the screen is structurally weak, and will rip or tear when struck by an object. This can create a safety problem if the screen is on a window of a multi-storied building. For example, a child could fall or run into the screen, and resultantly fall from the window.

BRIEF SUMMARY OF THE INVENTION

The present invention is directed to a screen which is stronger than conventional screen material. The screen comprises a sheet of material which contains a plurality of holes. The holes permit air to circulate from one side of the screen (e.g. inside a building) to the other side of the screen (e.g. outside of the building). The screen can be fabricated from a transparent material so that it does not block a user's view. The screen can be installed in a conventional screen frame so that can be easily fit into a window, door, or the like, and be locked in place. Because the screen is thicker and therefore structurally stronger than conventional screen material, the screen is harder to break and provides added security for a door or window (i.e. a deterrent against a burglar).

The screen can be combined with a layer of conventional screen material to block the passage of insects. Or conversely, if the holes are small enough, conventional screen material is not required. The holes in the screen are angled up from the outside surface to the inside surface. As such, moisture, such as from rain, cannot pass from the outside surface to the inside surface, but air is free to circulate in both directions. Other uses for the screen can include, in basements for air circulation, balconies, greenhouses for air ventilation, privacy fences, and many other uses described below.

In accordance with an embodiment, a screen includes a sheet which has a first side and an opposite second side. The sheet includes a plurality of holes which pass through the sheet from the first side to the second side. Each hole includes a first opening on the first side and a second opening on the second side. Each hole is bent so as to block vision from the first side to the second side.

In accordance with another embodiment, the sheet is fabricated from an opaque material.

In accordance with another embodiment, a layer of conventional screen material is embedded within the sheet.

In accordance with another embodiment, a layer of conventional screen material disposed adjacent at least one of (1) the first side of the sheet, and (2) the second side of the sheet.

In accordance with another embodiment, the sheet has a bottom edge. When the sheet is vertically oriented with the bottom edge down, each hole having the shape of an inverted V.

In accordance with another embodiment, each hole has a vertex. The sheet includes a plurality of spaced apart holes. A second hole passes through the vertices of all of the plurality of spaced apart holes. The second hole is coplanar with each of the plurality of spaced apart holes.

Other embodiments, in addition to the embodiments enumerated above, will become apparent from the following detailed description, taken in conjunction with the accompanying drawings, which illustrate, by way of example, the principles of the screen and method of use.

DETAILED DESCRIPTION OF THE INVENTION

Figure 1:
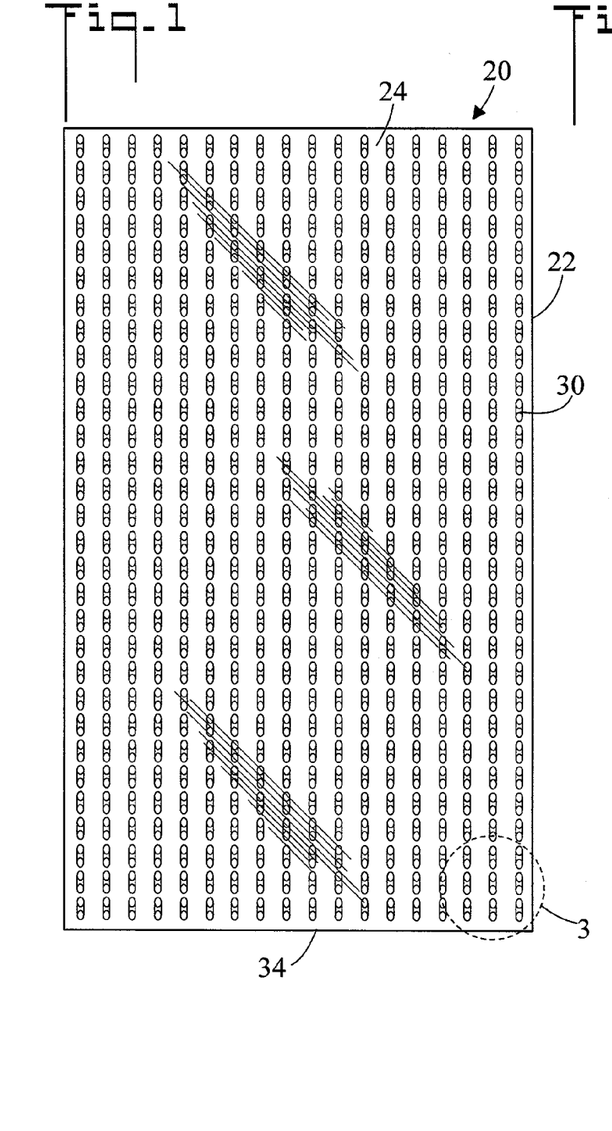
FIG. 1 is a front elevation view of a screen.
Figure 2:
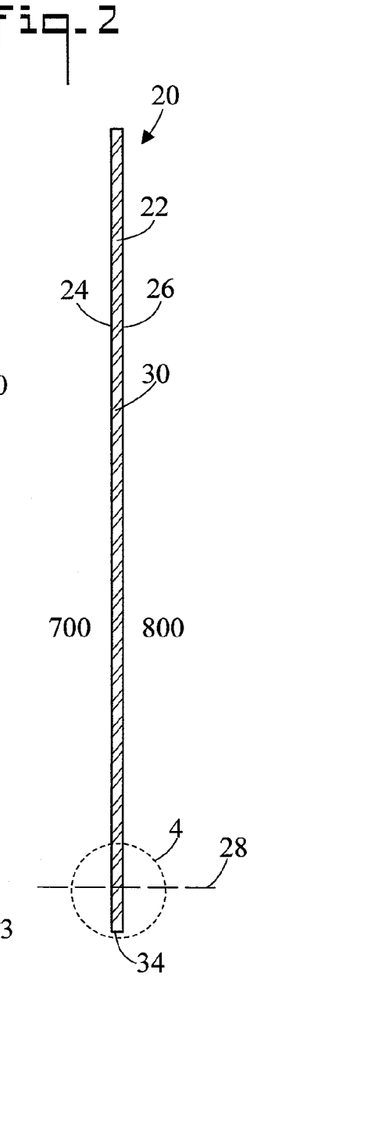
FIG. 2 is a side elevation view of the screen.
Figure 3:
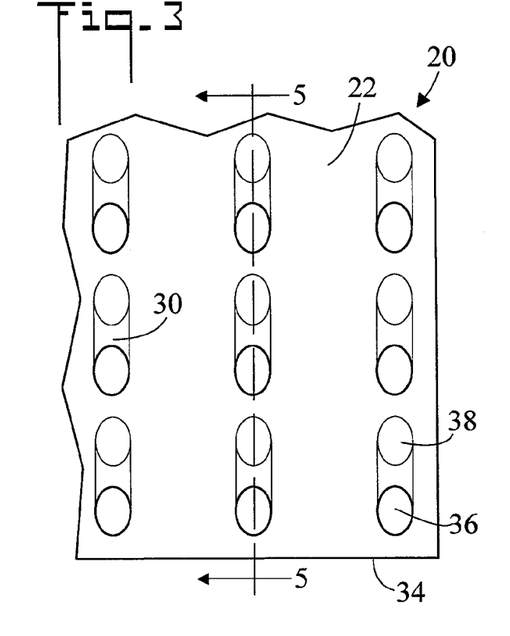
FIG. 3 is an enlarged fragmented view of area 3 of FIG. 1.
Figure 4:
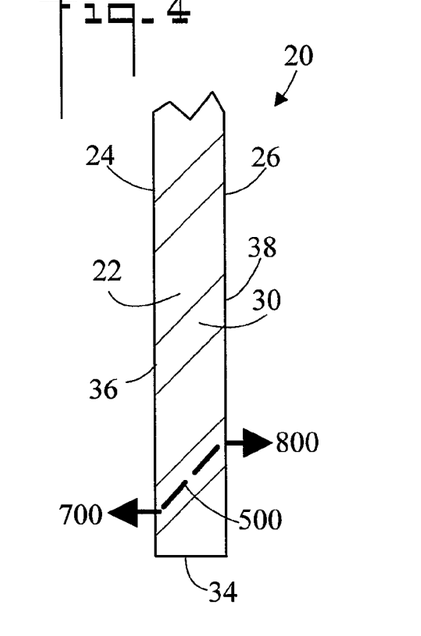
FIG. 4 is an enlarged fragmented view of area 4 of FIG. 2.
Figure 5:
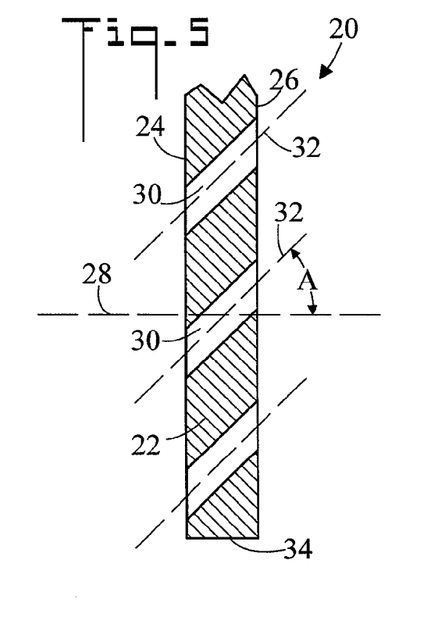
FIG. 5 is a fragmented cross sectional view along line 5-5 of FIG. 3.

Referring initially to FIGS. 1 and 2, there are illustrated front and side elevation views respectively of a screen, generally designated as 20. FIG. 3 is an enlarged view of area 3 of FIG. 1, FIG. 4 is an enlarged view of area 4 of FIG. 2, and FIG. 5 is a cross sectional view along line 5-5 of FIG. 3. Screen 20 includes a sheet 22. In the shown embodiment, sheet 22 is fabricated from a transparent material, such as a polymer or glass. Sheet 22 has a first side 24, an opposite second side 26, and a sheet axis 28 which is perpendicular to the first 24 and second 26 sides. Sheet 22 further includes a plurality of holes 30 which pass through sheet 22 from first side 24 to second side 26, each hole has a hole axis 32, and all hole axes 32 are parallel to one another. Referring to FIG. 5, each hole axis 32 forms a same acute angle A with sheet axis 28. In the shown embodiment, acute angle A is about 45°, however greater or smaller angles can also be used. Holes 30 can be of various sizes, shapes, and spacings. In the shown embodiment holes 30 are circular and spaced apart as shown (e.g. about ⅛ inch holes spaced apart about ⅜ inches). It may be appreciated however that holes 30 could be larger or smaller, have a different shape (e.g. square), and spaced closer together or further apart. Referring to FIG. 4, holes 30 permit a free flow of air 500 between first side 24 and second side 26.

Sheet 22 has a bottom edge 34. When sheet 22 is vertically oriented (as in FIGS. 1 and 2) with bottom edge down 34, hole axes 32 are upwardly angled from first side 24 to second side 26. Put in different terms, each hole 30 includes a first opening 36 on first side 24 and a second opening 38 on second side 26 (refer to FIGS. 3 and 4). When sheet 22 is vertically oriented with bottom edge 34 down, first opening 36 is disposed below second opening 38. This diagonally angled hole 30 feature ensures that moisture such as rain cannot pass from first side 24 (outside facing) to second side 26 (inside facing). It may be appreciated however, that for other purposes sheet 22 may be oriented with other than bottom edge 34 down.

In FIG. 2, screen 20 is shown positioned between outside air 700 and inside air 800 (such as in a window or door), with holes 30 angled so that moisture cannot pass from first side 24 to second side 26. It is noted that in FIGS. 1 and 2, screen 20 can be inverted up and down, but in order to maintain the moisture barrier, sheet 22 would also have to be rotated right to left.

Figure 6:
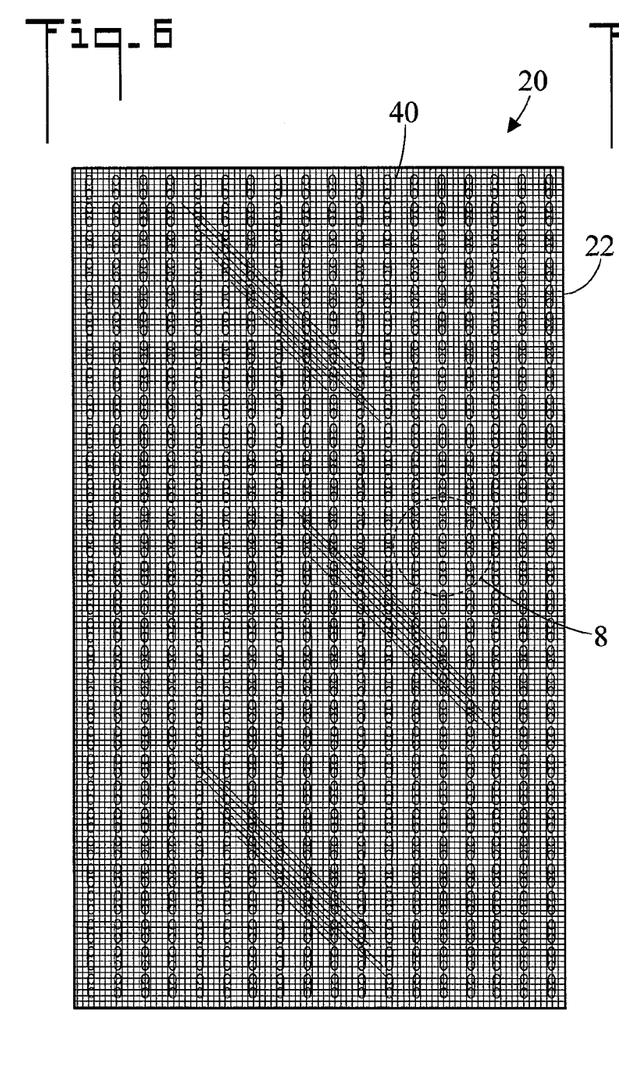
FIG. 6 is a front elevation view of a second embodiment.
Figure 7:
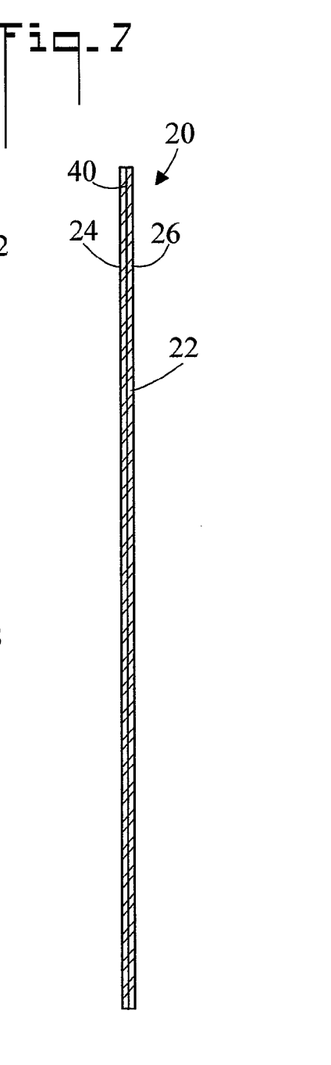
FIG. 7 is a side elevation view of the second embodiment.
Figure 8:
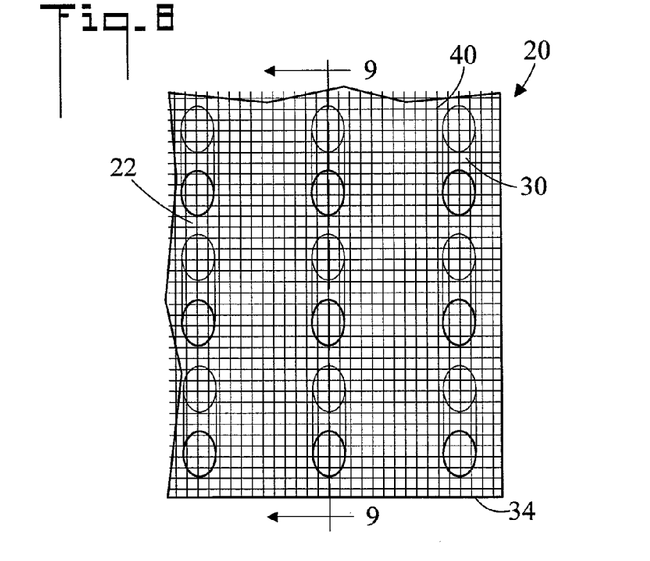
FIG. 8 is an enlarged fragmented view of area 8 of FIG. 6.
Figure 9:
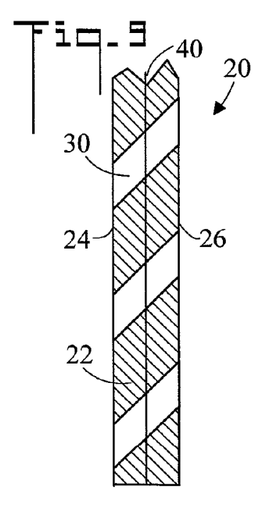
FIG. 9 is a fragmented cross sectional view along line 9-9 of FIG. 8.

FIGS. 6 and 7 are front elevation and side elevation views respectively of a second embodiment. FIG. 8 is an enlarged view of area 8 of FIG. 6, and FIG. 9 is a cross sectional view along line 9-9 of FIG. 8. This embodiment is similar to that of FIGS. 1-5, but also includes a layer of conventional screen material 40 which is embedded within sheet 22. As used herein, conventional screen material embraces any close mesh wire, polymer, or netting which is used as a barrier for insects (e.g. a window screen, a door screen, mosquito netting, and the like). The layer of conventional screen material 40 is sandwiched between first side 24 and second side 26 of sheet 22. As such, conventional screen material 40 forms an insect barrier across holes 30.

Figure 10:
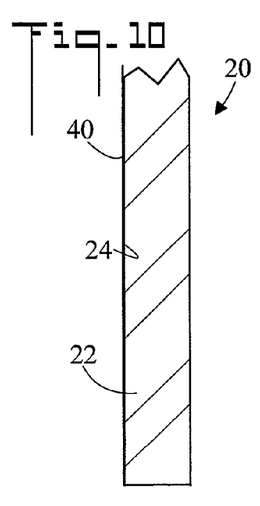
FIG. 10 is an enlarged fragmented side elevation view showing a different placement of conventional screen material.

FIG. 10 is an enlarged side elevation view showing a different placement of conventional screen material 40. In this embodiment, a layer of conventional screen material 40 is disposed adjacent first side 24 (such as by gluing).

Figure 11:
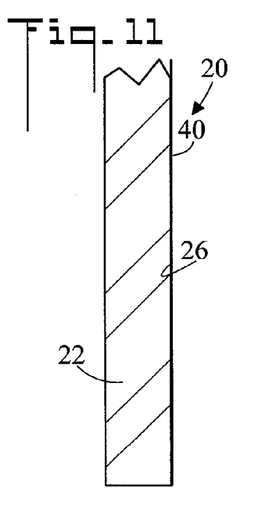
FIG. 11 is an enlarged side fragmented elevation view showing another placement of conventional screen material.

FIG. 11 is an enlarged side elevation view showing another placement of conventional screen material 40. In this embodiment, a layer of conventional screen material 40 is disposed adjacent to second side 26.

Figure 12:
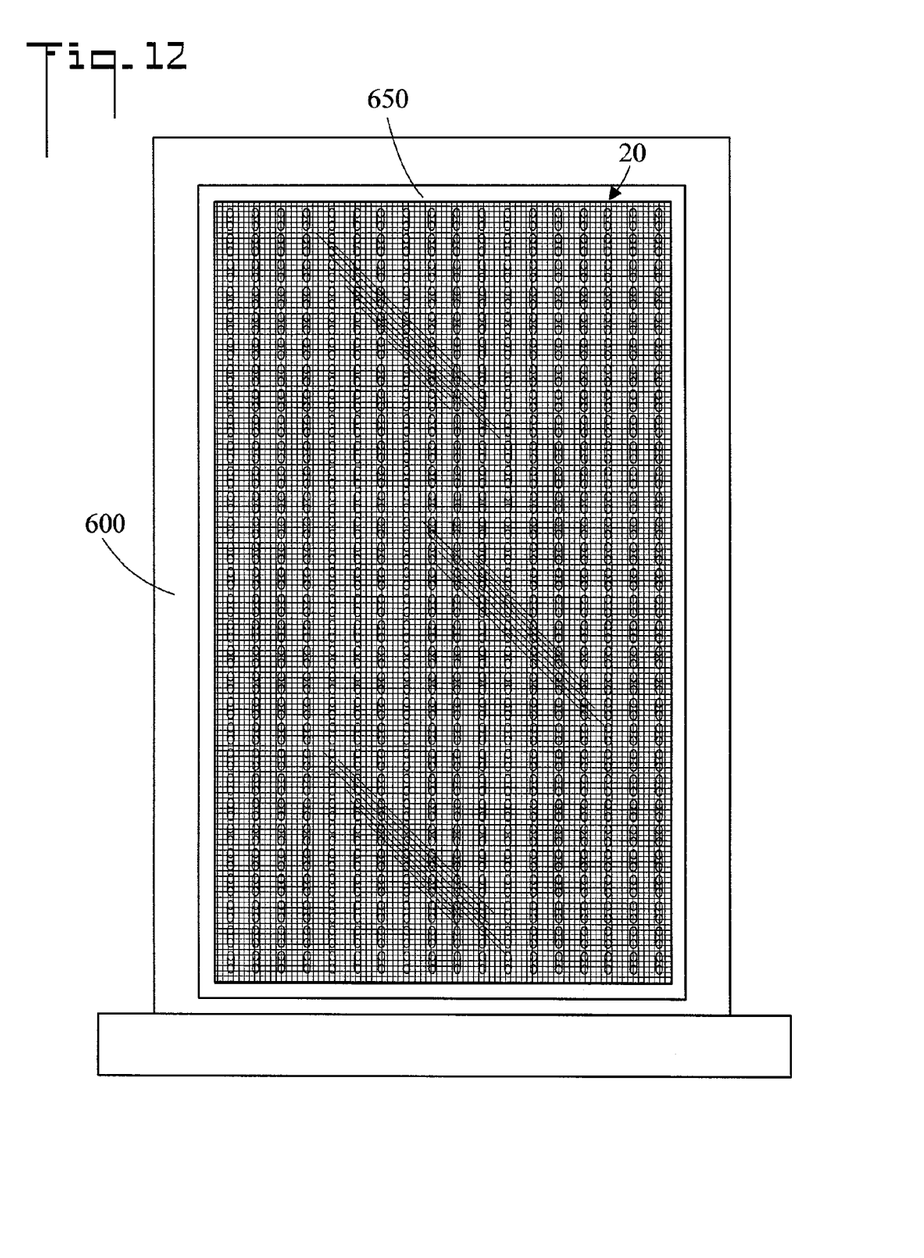
FIG. 12 is a front elevation view of the second embodiment screen used on a window.

FIG. 12 is a front elevation view of the second embodiment used on a window 600. Screen 20 can be placed in a frame 650 and installed in window 600 in the conventional manner.

Figure 13:
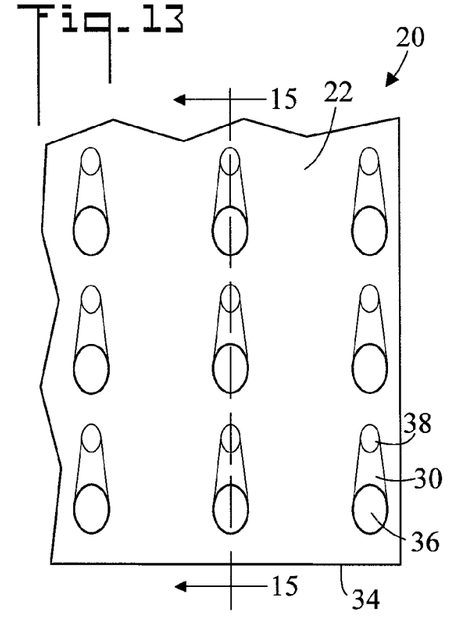
FIG. 13 is an enlarged fragmented front elevation view of a third embodiment.
Figure 14:
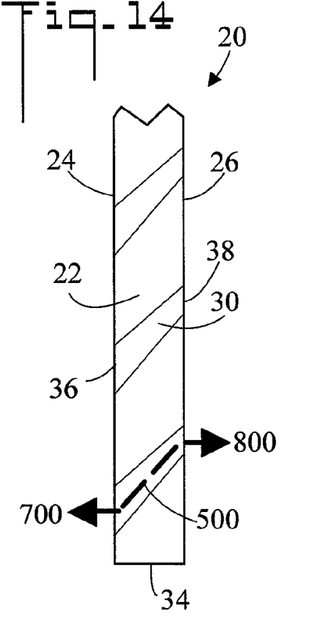
FIG. 14 is an enlarged fragmented side elevation view of the third embodiment.
Figure 15:
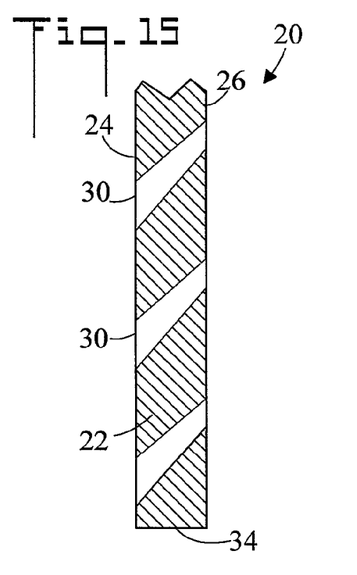
FIG. 15 is a fragmented cross sectional view along line 15-15 of FIG. 13.

FIG. 13 is an enlarged fragmented front elevation view of a third embodiment. FIG. 14 is an enlarged fragmented side elevation view of the third embodiment, and FIG. 15 is a fragmented cross sectional view along line 15-15 of FIG. 13. This embodiment is similar to the first embodiment shown in FIGS. 3-5, with the exception that holes 30 are tapered. In the shown embodiment, hole 30 is larger at first side 24 and tapers down at second side 26. It may be appreciated however that the tapering could also be in the opposite direction. Also shown in the FIGS. are first opening 36, second opening 38, air flow 500 between first side 24 and second side 26, outside air 700 and inside air 800.

Figure 16:
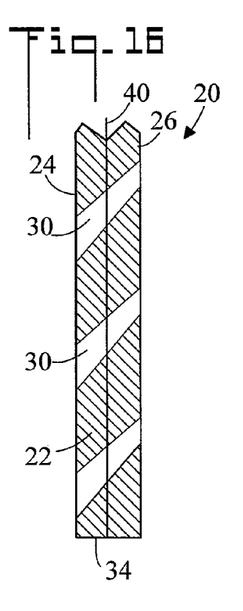
FIG. 16 is a fragmented cross sectional view of a fourth embodiment.
Figure 17:
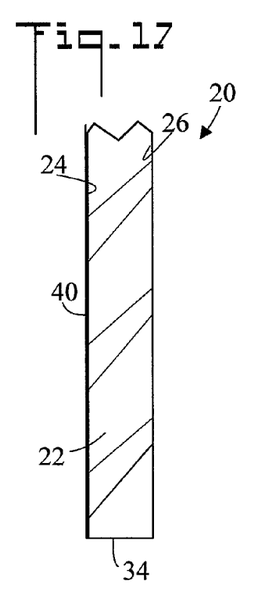
FIG. 17 is a fragmented side elevation view showing a different placement of conventional screen material.
Figure 18:
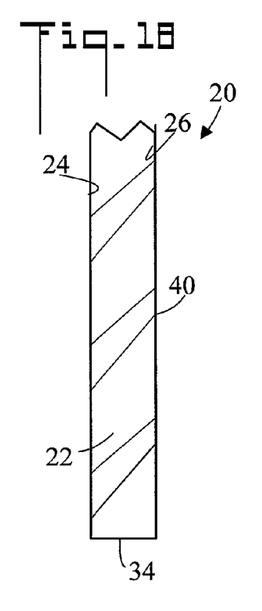
FIG. 18 is a fragmented side elevation view showing another placement of conventional screen material.

FIG. 16 is a fragmented cross sectional view of a fourth embodiment, FIG. 17 is a fragmented side elevation view showing a different placement of conventional screen material, and FIG. 18 is a fragmented side elevation view showing another placement of conventional screen material. This embodiment is the same as the third embodiment (FIGS. 13-15) except that a layer of conventional screen material 40 is connected to sheet 22. In FIG. 16 a layer of conventional screen material 40 is embedded within sheet 22 (as in FIG. 9). In FIG. 17, a layer of conventional screen material 40 is disposed adjacent first side 24 (as in FIG. 10), and in FIG. 18, a layer of conventional screen material 40 is disposed adjacent to second side 26 (as in FIG. 11).

It may also be appreciated that FIGS. 13-18 represent only a portion of a larger sheet 22 (not shown), similar to the relationship of FIGS. 3-5 and FIGS. 8-11 to FIGS. 1 and 2.

In the shown embodiments of FIGS. 1-18, sheet 22 is fabricated from a transparent material such as glass or plastic, however other embodiments can include an opaque sheet 22 fabricated from plastic, wood, cement, metal, or other suitable material (also refer to FIGS. 19-31).

Figure 19:
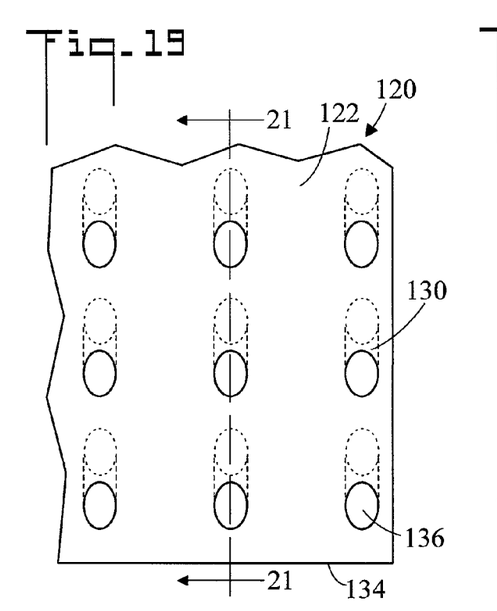
FIG. 19 is an enlarged fragmented front elevation view of a fifth embodiment.
Figure 20:
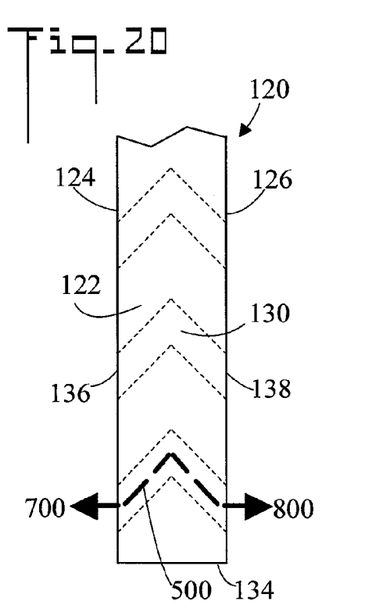
FIG. 20 is an enlarged fragmented side elevation view of the fifth embodiment.
Figure 21:
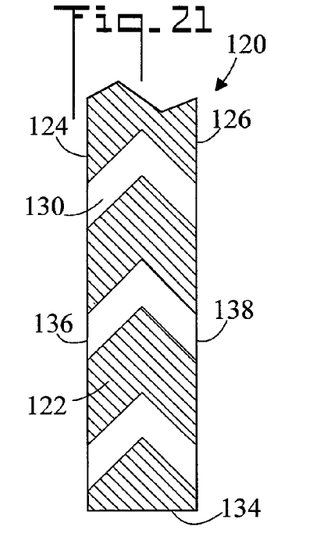
FIG. 21 is a fragmented cross sectional view along line 21-21 of FIG. 19.

FIG. 19 is an enlarged fragmented front elevation view of a fifth embodiment, generally designated as 120 FIG. 20 is an enlarged fragmented side elevation view of the fifth embodiment, and FIG. 21 is a fragmented cross sectional view along line 21-21 of FIG. 19. As in previous embodiments, screen 120 includes a sheet 122 which has a first side 124 and an opposite second side 126. Sheet 122 includes a plurality of holes 130 which pass through sheet 122 from first side 124 to said second side 126. Each hole 130 includes a first opening 136 on first side 124 and a second opening 138 on second side 126. Each hole 130 is bent (i.e. crooked or curved) so as to block vision from first side 124 to second side 126. That is, holes 130 are configured so that a person, regardless of the viewing angle, cannot look through hole 130 from first side 124 to second side 126 (or visa versa). This feature is in contrast to the embodiment shown in FIGS. 1-18, wherein if a person looked along hole axis 32, he/she could see through holes 130 of sheet 122. Because in an embodiment sheet 122 is opaque, in FIGS. 19 and 20, holes 130 are shown in dashed lines. In the shown embodiment, view is blocked by having holes 130 shaped like a V, however it may be appreciated that other bent shapes could accomplish the same vision-blocking purpose. Air 500 can pass through holes 130 from outside 700 to inside 800 or visa versa.

Sheet 122 has a bottom edge 134. When sheet 122 is vertically oriented with bottom edge 34 down, each hole 130 has the shape of an inverted V. It may be appreciated however, that if sheet 122 is vertically inverted, holes 130 would have the shape of a V.

Figure 22:
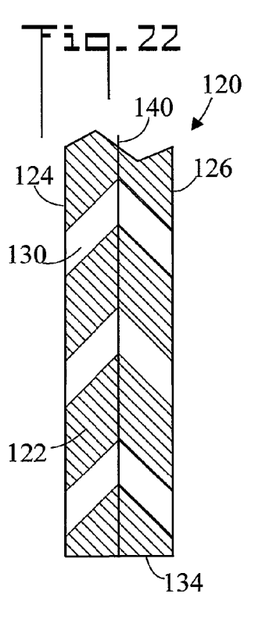
FIG. 22 is a fragmented cross sectional view of a sixth embodiment.
Figure 23:
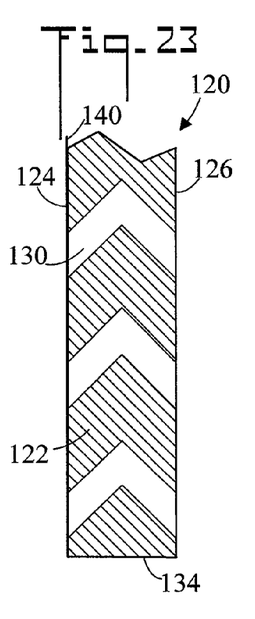
FIG. 23 is a fragmented cross sectional view showing a different placement of conventional screen material.
Figure 24:
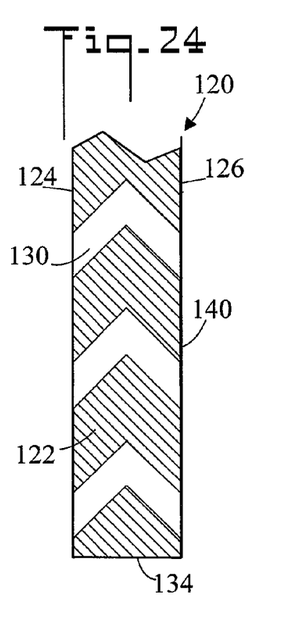
FIG. 24 is a fragmented cross sectional view showing another placement of conventional screen material.

FIG. 22 is a fragmented cross sectional view of a sixth embodiment, FIG. 23 is a fragmented cross sectional view showing a different placement of conventional screen material 140, and FIG. 24 is a fragmented cross sectional view showing another placement of conventional screen material 140. This embodiment is the same as the fifth embodiment (FIGS. 19-21) except that a layer of conventional screen material 140 is connected to sheet 122. In FIG. 22 a layer of conventional screen material 140 is embedded within sheet 122 (as in FIG. 9). In FIG. 23, a layer of conventional screen material 140 is disposed adjacent first side 124 (as in FIG. 10), and in FIG. 24, a layer of conventional screen material 140 is disposed adjacent to second side 126 (as in FIG. 11).

Figure 25:
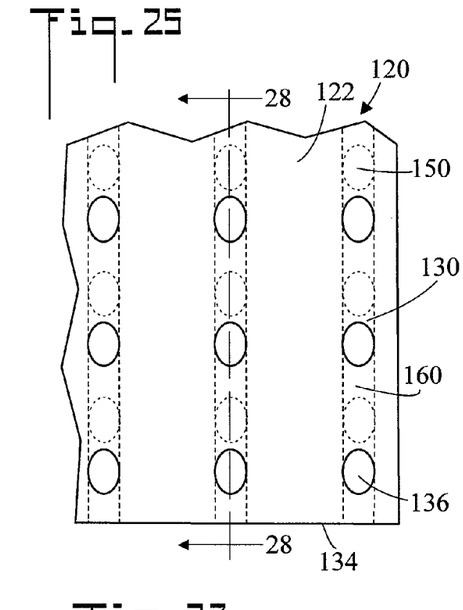
FIG. 25 is an enlarged fragmented front elevation view of a seventh embodiment.
Figure 26:
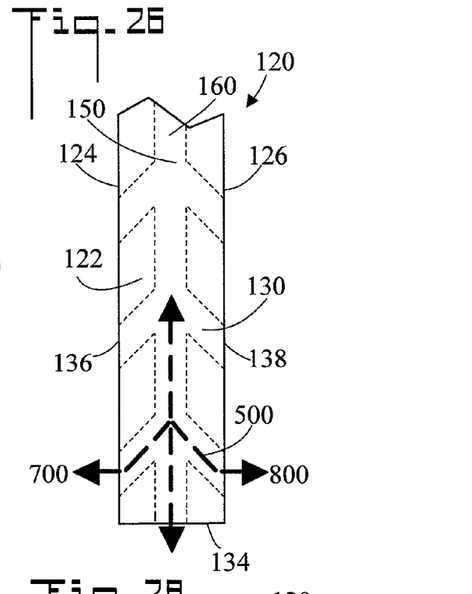
FIG. 26 is an enlarged fragmented side elevation view of the seventh embodiment.
Figure 27:
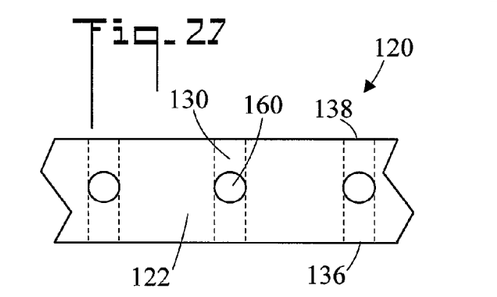
FIG. 27 is a top plan view of FIG. 25.
Figure 28:
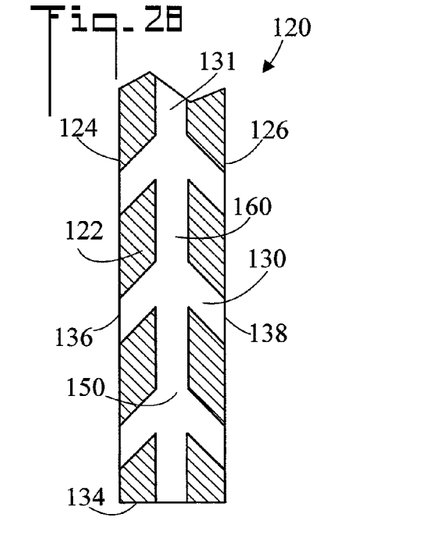
FIG. 28 is a fragmented cross sectional view along line 28-28 of FIG. 25.

FIG. 25 is an enlarged fragmented front elevation view of a seventh embodiment, generally designated as 120 FIG. 26 is an enlarged fragmented side elevation view of the seventh embodiment, FIG. 27 is a top plan view of FIG. 25, and FIG. 28 is a fragmented cross sectional view along line 28-28 of FIG. 25. The seventh embodiment is similar to the fifth embodiment of FIGS. 19-21, with the exception that a second connecting hole is added. In the seventh embodiment, each inverted V shaped hole 130 has a vertex 150 (the top of the inverted V as shown). Sheet 122 includes a plurality of spaced apart holes 130 (vertically space apart as shown). A second hole 160 passes through vertices 150 of all of the plurality of spaced apart holes 130. Second hole 160 is coplanar with each of the plurality of spaced apart holes 130. Put another way, a long hole 160 (which is vertical as shown in the figures) passes through the vertices 150 of all vertically spaced holes 130, thereby connecting all of the holes 130. Sheet 122 includes a plurality of second holes 160, wherein each second hole 160 connects a string of holes 130. In the seventh embodiment, air 500 can circulate through each hole 130 between first side 124 and second side 126, and also between adjacent holes 130 via second hole 160 (refer to FIG. 26). Air 500 can pass through holes 130 from outside 700 to inside 800 or visa versa.

Figure 29:
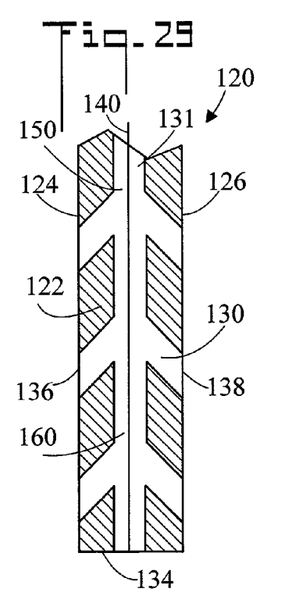
FIG. 29 is a fragmented cross sectional view of an eighth embodiment.
Figure 30:
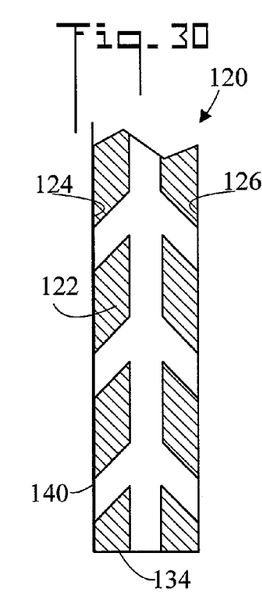
FIG. 30 is a fragmented cross sectional view showing a different placement of conventional screen material; and, FIG. 31 is a fragmented cross sectional view showing another placement of conventional screen material.
Figure 31:
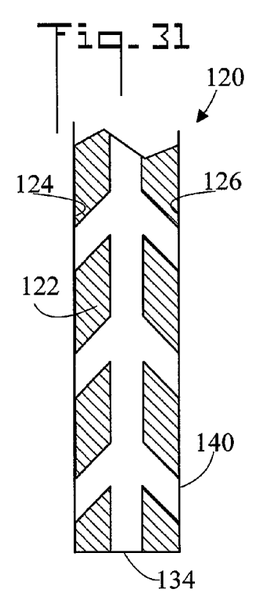

FIG. 29 is a fragmented cross sectional view of an eighth embodiment, FIG. 30 is a fragmented cross sectional view showing a different placement of conventional screen material 140, and FIG. 31 is a fragmented cross sectional view showing another placement of conventional screen material 140. This embodiment is the same as the seventh embodiment (FIGS. 25-28) except that a layer of conventional screen material 140 is connected to sheet 122. In FIG. 29 a layer of conventional screen material 140 is embedded within sheet 122 (as in FIG. 9). In FIG. 30, a layer of conventional screen material 140 is disposed adjacent first side 124 (as in FIG. 10), and in FIG. 31, a layer of conventional screen material 140 is disposed adjacent to second side 126 (as in FIG. 11).

It may also be appreciated that FIGS. 19-31 represent only a portion of a larger sheet 122 (not shown), similar to the relationship of FIGS. 3-5 and FIGS. 8-11 to FIGS. 1 and 2.

In the shown embodiments of FIGS. 19-31, sheet 122 is fabricated from an opaque material such as from plastic, wood, cement, metal, or other suitable material. However, sheet 122 can also be fabricated from a transparent material.

As defined herein the term "sheet" can include either (1) a single sheet of material (for example as shown in FIGS. 4-5, and 9-11, or (2) a sheet comprised of a plurality of sheet layers. For example in FIGS. 9, 16, 22, and 29, two sheet layers could be provided with conventional screen material 40 (140) disposed between the two sheet layers.

Also, in the embodiments shown in FIGS. 1-31 holes 30 (130) are straight (linear), or are made of linear holes segments, and have a circular cross section. However, it may be appreciated that holes 30 (130) could be curved and have other cross sectional shapes (e.g. square, oval, etc.). Further, the various embodiments shown above can be used in combination as seen fit by the user, and for decoration purposes the holes can be angled in any way the user sees fit.

It may be further appreciated that the screen of any of the aforementioned embodiments could be fabricated from flexible material, and used for clothing such as shoes, pants, shorts, hats, etc. Also, the screen of the embodiments shown in FIGS. 1-31 can be used vertically as shown, or can be oriented horizontally. Further, the embodiments of FIGS. 1-31 can be inverted, or rotated either right or left 90°.

In terms of use, a method for screening outside air 700 from inside air 800 including: (refer to FIGS. 1-12)

(a) providing a screen 20 including;
   a sheet 22 having a first side 24 and an opposite second side 26;
   sheet 22 including a plurality of holes 30 which pass through sheet 30 from first side 24 to second side 26;
   each hole 30 including a first opening 36 on first side 24 and a second opening 38 on second side 26;
   sheet 22 having a bottom edge 34;
   when sheet 22 is vertically oriented with bottom edge 34 down, first opening 36 is disposed below second opening 38;
   sheet 22 fabricated from a transparent material; and, (b) vertically orienting sheet 22 and placing sheet 22 between the outside air 700 and the inside air 800 so that first side 24 faces the outside air 700 and second side 26 faces the inside air 800.

The screens of the present invention have many possible uses. For example the embodiments shown in FIGS. 1-12 can be used as:

window screens, patio door screens, patio doors which require year round air circulation, basement window screens, and air circulation can be adjusted by providing two screens having offsetting holes
   security bank teller screens which allow air circulation and voice communication
   clean rooms, overhead benches and tables
   privacy and semi-private screen area
   property fences, transformer rooms
   greenhouses
   electronic enclosures
   window wells
   seed sprouters
   pizza pans
   fireplace screens
   drain covers
   vents
   a waterfall wherein the screen is tilted with a water tank located at the top
   clothing such as pants, hats (vented and water proof)
   a combination of screens with different hole sizes can be used for embedded lights and fitted with small plants
   the thickness of the screen can be adjusted to fit a particular need In addition to the above uses, the tapered embodiment of FIGS. 13-18 can used in a living wall for plants.

The embodiments of FIGS. 19-24 can be used as FIGS. 1-12 wherever side-to-side ventilation is required.

The embodiments of FIGS. 25-31 can be used as above, and also in walkways in wet areas, cardboard boxes which require ventilation. The embodiments of FIGS. 25-31 can also be used in the following ways:

1. Anti fog mask (Fog Free)
2. Anti splash outdoor floor mat liquid passes through holes at an angle to lower channel and out other holes, sloped properly liquid will drain out.
3. Butcher shop floor mat between door openings. Laced with chemicals to clean shoes as you pass through doors from room to room (currently puddle of water & chemical used).
4. Transformer station ventilation.
5. Green house ventilation—hot air rises from side through the middle.
6. Clean rooms disinfectant—higher pressure in ceiling plenum ridding of contaminants.
7. Operating room ceiling panel—cold or hot air is dispersed at an angle not directly on patient.
8. Patio slab—holes are slanted—no backsplash and permeable, water is dispersed underneath.
9. Architectural panels for led lighting with various embossed surfaces.
10. Patio doors/windows/screens—anti fog—security and with air circulation.
11. Ventilated communication structure, gearbox housing (ventilated), heat sink, etc.
12. Multi-direction fan screen.
13. Peg board—can be used both sides
14. Respirator, patient breathing mask.
15. Ventilated lighting fixture body.
16. Ventilated sports helmet
17. Ventilated pet carrier
18. Knee, elbow, shoulder guard, soccer leg guard.

The embodiments of the screen and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the screen and method of use should be construed as limiting the invention to a particular embodiment or combination of embodiments. The scope of the invention is defined by the appended claims.

I claim:

1. A screen, comprising:
a sheet having a first side and an opposite second side;
said sheet including a plurality of holes which pass through said sheet from said first side to said second side;
each said hole including a first opening on said first side and a second opening on said second side;
each said hole being bent so as to block vision through said holes from said first side to said second side;
each said hole having a vertex;
said plurality of holes including a column of spaced apart holes; and,
a straight hole which passes through said vertices of all said holes of said column of spaced apart holes.

2. The screen according to claim 1, further including:
said sheet fabricated from an opaque material.

3. The screen according to claim 1, further including:
a layer of conventional screen material embedded within said sheet.

4. The screen according to claim 1, further including:
a layer of conventional screen material disposed adjacent at least one of (1) said first side of said sheet, and (2) said second side of said sheet.

\* \* \* \* \*